July 11, 1972 SANG-CHUL KIM 3,676,044

CIRCUIT UTILIZING MAGNETIZED CORES FOR SEQUENTIALLY FLASHING PHOTOFLASH LAMPS

Filed Feb. 16, 1971

Inventor:
Sang-Chul Kim
by Norman C. Fulmer
His Attorney 3,676,044
CIRCUIT UTILIZING MAGNETIZED CORES FOR SEQUENTIALLY FLASHING PHOTO-FLASH LAMPS Sang-Chul Kim, Cleveland Heights, Ohio, assignor to General Electric Company Filed Feb. 16, 1971, Ser. No. 115,469
Int. Cl. F21k 5/02
U.S. Cl. 431—95 12 Claims

ABSTRACT OF THE DISCLOSURE

A plurality of photoflash lamps are connected electrically to a source of firing pulses through a succession of magnetized cores. The cores are magnetized in a polarity so as to resist passage of the firing pulse. Each firing pulse has sufficient energy to overcome the magnetization effect of one core, whereby a different individual lamp is flashed upon the occurrence of each firing pulse.

BACKGROUND OF THE INVENTION

The invention is in the field of electrical circuitry for sequentially flashing photoflash lamps, and is particularly useful with a unitary array of flash lamps, such as three or four or more lamps arranged to radiate their light in the same direction when they are sequentially flashed, so that the array need not be moved nor removed until all of its lamps have been flashed.

Numerous circuits have been devised for sequentially flashing photoflash lamps by pulses of electrical energy such as are obtained from the battery through a momentarily closed switch or from a capacitor which has been charged through a resistor from a battery, or from some other suitable energy source. Such a pulse of electrical energy usually is initiated by closure of a switch associated with the shutter mechanism of a camera. One type of circuit heretofore proposed employs mechanically actuated switches for applying the electrical pulses to successively different flashbulbs; another type of circuit utilizes heat-responsive or light-responsive means associated with the flash lamps and adapted to actuate switching means for connecting the pulse source to successively different flash lamps as each of the lamps becomes flashed; and a further type of circuit utilizes transistors or thyristors for automatically connecting the pulse source to successively different flash lamps as each of the lamps becomes flashed.

Another previously proposed type of circuit employs impedance means, such as resistors, successively connected in series with a plurality of individual flash lamps, so that the lamps are connected in electrical parallel through the resistors. The firing pulse source is connected to an end of the circuit, whereby each flash lamp is connected across the pulse source through successively greater resistance. The first pulse flashes the nearest lamp, which becomes an open circuit upon flashing, whereupon the next pulse flashes the next lamp, etc. As each successive lamp is flashed, its firing pulse flows through successively greater values of power-consuming series resistance, so that the later lamps in the array receive considerably less of the firing pulse energy than do the earlier lamps. The firing pulses must have ample energy to insure flashing of the later lamps in the circuit, and therefor the earlier lamps receive much greater firing pulse energy than is needed for flashing them. In order to insure flashing of only one flash lamp (the nearest unflashed lamp to the pulse source) per firing pulse, it is desirable that the series resistors have relatively large values of resistance as compared to the resistance of the flash lamp filaments. On the other hand, low values of series resistances are desired, because large values of series resistance consume relatively large amounts of energy from the firing pulse so that it is desirable to provide a greater amount of firing pulse energy to insure that all of the lamps can be flashed. It has been found that this dilemma of desiring larger resistance values for one reason, and smaller resistance values for another reason, is not easy to resolve satisfactorily for insuring that only one flash lamp will flash per firing pulse and also that the energy per pulse will be capable of successively flashing all of the lamps of the array, with an economically feasible value of firing pulse voltage. These difficulties tend to offset an important advantage of the resistance network circuit: its low cost, so that the circuit can be included in a throw-away multiple lamp unit, whereby only two electrical connections need be provided between the multiple lamp unit and the camera or flash adaptor with which it is used.

The reliability of the above-described resistance sequential flashing circuit can be improved if the flash lamps of the array have differing filament resistances, the lamp nearest the firing pulse source having the lowest filament resistance and the remaining lamps having successively higher values of filament resistance. However, this expedient suffers the disadvantage of higher costs of manufacturing the different-resistance lamps and of keeping track of which lamps have which filament resistance during storage and during assembly into the flash array. Another disadvantage of an array in which the lamps have differing filament resistances, is a reduction of flashing reliability because some of the lamps will not have optimum filament resistance for being flashed by the firing pulse.

SUMMARY OF THE INVENTION

Objects of the invention are to provide an improved circuit for sequentially flashing flashbulbs; to provide such a circuit which is free from the above-described disadvantages of prior circuits; and to provide such a circuit that is low in cost and highly reliable in operation.

The invention comprises, briefly and in a preferred embodiment, a plurality of photoflash lamps to be sequentially flashed by a sequential series of firing voltage pulses, and a plurality of magnetized core coupling means successively connected in series between the lamps, so that the lamps are connected in an electrical parallel circuit through the magnetized core coupling means. The firing voltage pulse source is connected across an end of the lamp circuit. The cores are magnetized so as to resist passage of the firing voltage pulses. Each firing pulse has sufficient energy to overcome and reverse the magnetization effect of one core, whereby a different individual lamp is flashed upon the occurrence of each firing pulse.

DESCRIPTION OF THE PREFERRED EMBODIMENT

Figure 1:
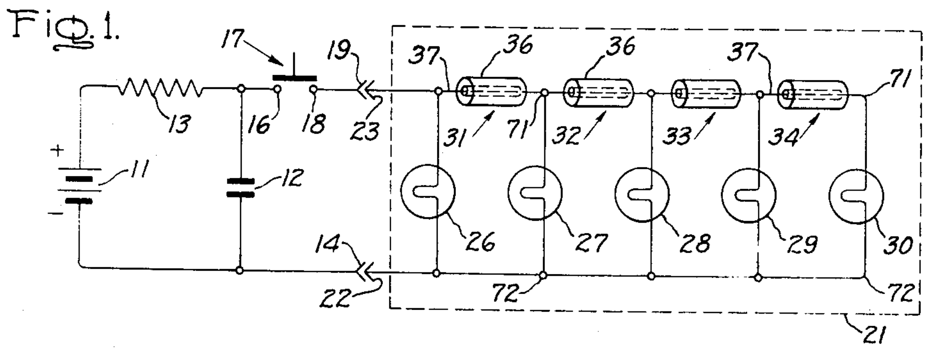
FIG. 1 is an electrical diagram of a preferred embodiment of the invention.

In the circuit of FIG. 1, a battery 11 is connected to charge a capacitor 12 through a resistor 13. In a preferred arrangement, the battey 11 has a voltage of six volts, the capacitor 12 has a capacitance of 500 microfarads, and the resistor 13 has a resistance of 1000 ohms. One terminal of the capacitor 12 is connected to a connector plug terminal 14, and the other terminal of capacitor 12 is connected to a terminal 16 of a switch 17, the other terminal 18 thereof being connected to a second connector plug terminal 19. The switch 17 is adapted to be momentarily closed in synchronization with the opening of a camera shutter, in well-known manner. The circuitry thus far described functions as a source of electrical energy pulses for flashing photoflash lamps, and may be incorporated in a camera, or in a flash attachment for use with a camera. Although the firing pulse is sometimes called a "voltage" pulse, it is primarily the energy of the pulse, comprising the product of voltage, current, and time duration, that causes a lamp to flash.

A flash lamp array unit 21 is provided with a pair of connector prongs 22 and 23 adapted for electrical engagement with the terminals 14 and 19, respectively. The unit 21 contains a plurality of photoflash lamps 26 through 30 which may be of conventional type, such as General Electric type AG–1, each containing a filament provided with electrical connection lead wires and adapted for initiating a flash of combustible material contained within the bulb. One end of the filaments of each of the lamps 26–30 is connected to the connector prong 22. The other end of the filament of the first lamp 26 is connected to the connector prong 23, and the other ends of the remaining filaments of lamps 27–30 are successively connected, through magnetized core coupling means 31 through 34, to the connector prong 23. Thus, in effect, the lamps 26–30 are connected in a parallel combination through the magnetized core coupling means 31–34, this parallel combination being adapted for connection across the source of energy pulses at the terminals 14 and 19.

Preferably the lamps 26–30 of the array 21 are provided with individual reflectors, and arranged to radiate the light emitted therefrom in the same direction. If desired, another combination of lamps and magnetized coupling means may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from a single unit. Other connector prongs similar to 22 and 23 could be provided for connecting the rear array of lamp circuitry to the connectors 14 and 19 when the unit is turned around so that the "rear" aray of flash lamps faces frontwardly.

Figure 5:
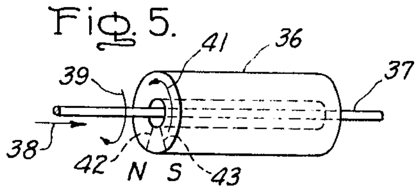
FIG. 5 is a perspective view of a magnetized core coupling means, showing the relative polarizations of electric and magnetic fields.

Each of the magnetized core coupling means 31–34 may comprise, as shown in each of FIGS. 1 and 5, a hollow cylindrical core 36 through which the electrical conductor 37 passes, going from one lamp to the next. Each core is circularly magnetized in a direction so as to oppose and resist the passing of firing pulse energy in the conductor 37 through the core 36. With a positive-polarity firing pulse current flowing from left to right as in the circuit of FIG. 1, and as indicated by the arrow 38 in FIG. 5, a circular magnetic field will be set up around the conductor 37, in a clockwise direction, as indicated by the arrow 39 in FIG. 5. The core is circularly magnetized in a counter-clockwise direction, as indicated by the arrow 41 in FIG. 5, and thus tends to oppose and resist the passage of current 38 therethrough. The circular magnetization of the core 36 does not have any discrete north and south poles; however, if a section of the core were sliced away as indicated by the dashed lines 42 and 43, there would be a north pole at the surface defined by line 42, and a south pole at the surface defined by line 43.

Figure 2:
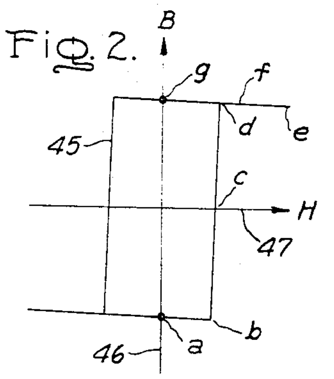
FIG. 2 shows a square-loop hysteresis curve for a magnetized-core coupling means.

If a sufficient magnitude of current is passed through the conductor 37 in the core 36, its magnetic field 39 will overcome the magnetic field 41 of the core and will cause reverse-magnetization of the core, whereupon the core's magnetic field 41 will be in a clockwise direction, whereupon the core 36 no longer provides any opposition or resistance to the passage of current 38 through the conductor 37. FIG. 2 illustrates the core's magnetization reversal by means of the hysteresis curve 45 for the core, in which the vertical axis 46 represents the flux density B of the core 36 and the horizontal axis 47 represents magnetizing force H acting on the core. The core 36 is initially "permanently" magnetized at point *a* on curve 45, in the direction of arrow 41 in FIG. 5, the value of applied magnetizing force H being zero. Upon application of a sufficient magnetizing force 39 (FIG. 5) due to current 38 flowing in conductor 37, the magnetization of the core follows the path *a–b–c–d–e–f–g* along the hysteresis curve 45 of FIG. 2, and remains "permanently" magnetized at point *g*, which is a reverse orientation of that of point *a*. As described above, when the core 36 is reverse- magnetized at point *g* of hysteresis curve 45, the current 38 can flow freely through the conductor 37 without any opposition due to the core 36.

Magnetized cores can be interposed in the circuit between some or all of the lamps along the conductor that is connected to the connector 22, in lieu of or in addition to the cores shown in FIG. 1. Each core may be made of magnetizable ferromagnetic material, preferably at least one-half inch long and one-quarter inch outside diameter. Alternatively, the coupling means can comprise one or more turns of wire wound on a toroidal core.

The circuit of FIG. 1 functions as follows. Upon a momentary closing of the switch 17, in synchronization with the opening of a camera shutter, the electrical energy stored in the capacitor 12 discharges into the circuit of the lamp unit 21, in the form of an electrical pulse having an approximately exponential decay characteristic. Most of the capacitor's electrical energy discharges through the filament of the first lamp 26, and, although a small portion of the energy may flow through the filaments of the remaining lamps 27–30 via the conductors 37, the magnetized cores 36 limit the amount of such energy to a value below that which will cause lamps 27–30 to flash. As the electrical energy of the pulse from capacitor 12 discharges through the filament of the first lamp 26, the filament resistance (which initially is about 0.6 ohm) increases as the filament becomes incandescent, and the filament burns out and becomes an open circuit as the lamp flashes. The moment at which the lamp 26 flashes and its filament becomes an open circuit, is a critical moment at which the next lamp 27 is most likely to undesirably flash, because when the filament of lamp 26 becomes an open circuit the remaining energy in capacitor 12 is available for the remaining lamps. However, at this moment the charge on capacitor 12 has reduced to a value such that it will not overcome the opposition effect of the magnetized coupling means 31, and hence no other lamps will be flashed. When the switch 17 is opened, the capacitor 12 becomes charged again.

Figure 4:
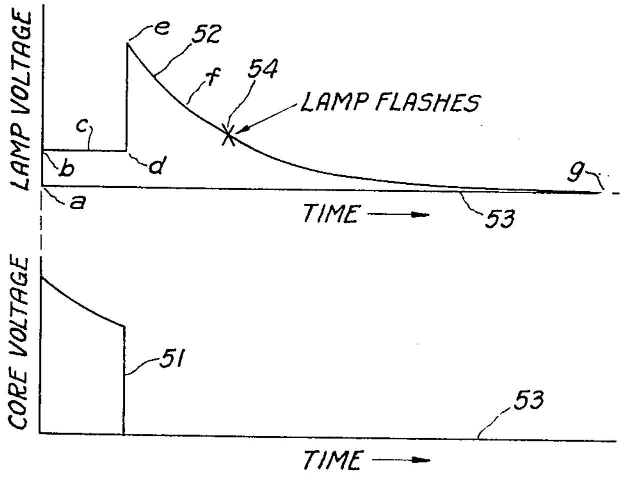
FIG. 4 is a plot of lamp voltage and core voltage, with respect to time, which occurs as a lamp is being flashed.

Upon the next momentary closing of the switch 17, in synchronization with the opening of the camera shutter, the electrical discharge firing pulse energy from the capacitor 12 is sufficiently great to cause reverse-magnetization of the coupling means 31, in the manner described above, whereupon the remaining pulse energy causes the second lamp 27 to flash, at which time the remaining pulse energy is not sufficient to cause reverse-magnetization of the second coupling circuit 32. When the aforesaid second firing pulse occurs, the first lamp is an open circuit (because it has been flashed) and the firing pulse is applied across the series combination of the first magnetized coupling means 31 and the second lamp 27. FIG. 4 shows the firing pulse voltage distribution between these two series components, the curve 51 being the portion of firing pulse voltage across the coupling means 31 and curve 52 being the portion of firing pulse voltage across the filament of lamp 27, both curves being with respect to the same time base 53. Initially, a major portion of the pulse voltage is across the core coupling means 31, and when reverse-magnetization occurs, the entire voltage of the pulse is across the lamp 27. Points of curve 52 are labeled *a* through *g*, corresponding to points in time to the similarly lettered points of the hysteresis curve 45 of FIG. 2. When the reversing magnetization of the core passes from point *d* and around the tip *e* of the hysteresis curve 45, the voltage drop across the core-coupling means reduces to zero and the full voltage of the pulse is applied to the flash lamps, as shown in FIG. 4, and the lamp flashes at approximately the point 54 as indicated on curve 52. The foregoing procedure is repeated until all of the lamps of the array 21 have been flashed, and the flashing of each lamp, after the first lamp 26 has been flashed, occurs in the manner illustrated in FIG. 4 because after each lamp is flashed, the next firing pulse is applied across the series combination of the next magnetized coupling means and lamp.

Figure 3:
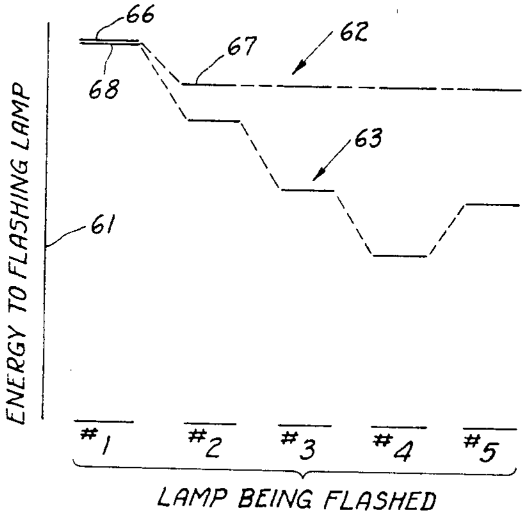
FIG. 3 is a plot of two comparison curves of firing pulse energy applied to the successive lamps as they are flashed, for the circuit of the invention shown in FIG. 1, and for a prior-art resistance circuit.

In FIG. 3, the vertical axis 61 represents the amount of firing pulse energy applied to a lamp being flashed, and the horizontal base representation is of the five lamps 26–30 of FIG. 1. The solid-line portions of curve 62 represent the firing pulse energy applied to each of the five lamps as they are successively flashed by means of the circuit of FIG. 1, in accordance with the invention, and curve 63 represents the same criteria for a prior-art resistance circuit having resistance coupling substituted for the respective magnetized coupling means 31–34. When the first lamp 26 is flashed by the circuit of FIG. 1, it receives substantially the full energy of the firing pulse, as indicated by portion 66 of curve 62. When the second lamp 27 is flashed, it receives slightly less energy as indicated by portion 67 of curve 62, due to some of the pulse energy having been consumed in reverse-magnetizing the coupling means 31. Each succeeding lamp likewise receives an amount of energy at the level indicated by numeral 67, since the lamp flashing is preceded by the reverse-magnetizing of a single immediately preceding core. Thus, as is evident from curve 62, each of the lamps 26–30 of FIG. 1 is flashed by substantially the same value of firing pulse energy, and all lamps but the first are flashed by equal values of firing pulse energy. This uniformity of firing pulse energy applied to each lamp to be flashed, by means of the invention, assures good reliability that a single lamp, and no more than one lamp, will flash per firing pulse.

As indicated by curve 63 of FIG. 3, for a prior-art resistance-coupled lamp circuit, the first lamp to be flashed receives substantially the full energy of the firing pulse, as indicated by portion 68 of curve 63. Each succeeding lamp, as it is flashed, receives relatively less firing pulse energy, due to increasingly greater pulse energies being consumed in the successively increasing amounts of series resistance as the lamps become flashed. The last lamp No. 5, however, receives relatively greater pulse energy than the preceding lamp because there then is no unflashed lamp in shunt (through a resistance) therewith to dissipate some of the pulse energy. The relatively great differences in firing pulse energies applied to the lamps being flashed, ranging from relatively large pulse energies for the earlier lamps to much smaller energies for the later lamps, creates an undesired possibility that, when the first or second lamp is flashed there will be enough excess pulse energy to cause undesirable flashing of the next lamp; also there is the undesired possibility that the lower pulse energies applied to the later lamps might not be sufficient to insure reliable lamp flashing.

If desired, the flash array unit 21 may be removed from the camera or flash adaptor after some of its lamps have been flashed, and reinserted at a later time for flashing the remaining lamps. After the lamps have been flashed, the array unit 21 may be discarded. The success and reliability of the circuit just described, is largely due to the fact that a relatively large amount of each firing pulse energy discharge is applied to the nearest unflashed lamp, with relatively little of the energy being applied to the remaining lamps of the circuit.

The circuitry of the invention can be incorporated into a camera or flash adaptor instead of in a disposable flash array, with the requisite number of electrical connectors being provided for connecting the filament lead wires of the lamps 26, etc., of the array respectively across the different pairs of firing pulse lamp terminal points 71, 72 of the circuitry.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A circuit for causing a plurality of photoflash lamps to be flashed sequentially by sequential firing energy pulses of given magnitude and electrical polarity, said circuit comprising a plurality of pairs of connection terminal points adapted for electrical connection thereto of respective individual lamps of said plurality of flash lamps, wherein the improvement comprises connection means including one or more magnetized core coupling means successively connected in series between said pairs of terminal points to connect said pairs of terminal points into an electrical parallel circuit through said magnetized core coupling means, a first pair of said terminal points at one end of said parallel circuit being adapted for connection to a source of said firing pulses, each of said magnetized core coupling means being magnetized so as to oppose the flow of said firing pulses therethrough, said energy magnitude of a firing pulse being sufficient to reverse the magnetic opposition of a single magnetized core coupling means and cause flashing of a lamp connected to the next succeeding pair of terminal points.

2. A circuit as claimed in claim 1, in which each of said magnetized core coupling means comprises an electrical conductor connected between a terminal point of one of said pairs of terminal points and a terminal point of another of said pairs of terminal points, and a magnetized core positioned adjacent to said conductor.

3. A circuit as claimed in claim 2, in which said magnetized core comprises a hollow cylinder of circularly magnetized material, and in which said electrical conductor passes through said hollow cylinder.

4. A circuit for causing a plurality of photoflash lamps to be flashed sequentially by sequential firing energy pulses of given magnitude and electrical polarity, said circuit comprising first and second pairs of connection terminal points adapted for electrical connection thereto of respective individual lamps of said plurality of flash lamps, wherein the improvement comprises a magnetized core coupling means connected between a first terminal point of said first pair and a first terminal point of said second pair of terminal points, and means electrically connecting together the remaining terminal points of said first and second pairs of terminal points, said first pair of terminal points being adapted for connection to receive said firing pulses, said magnetized core coupling means being magnetized so as to oppose the flow of said firing pulses therethrough, said energy magnitude of a firing pulse being sufficient to reverse the magnetic opposition of said magnetized core coupling means and cause flashing of a lamp connected to said second pair of terminal points.

5. A circuit as claimed in claim 4, in which said magnetized core coupling means comprises an electrical conductor connected between said first terminal points, and a magnetized core positioned adjacent to said conductor.

6. A circuit as claimed in claim 5, in which said magnetized core comprises a hollow cylinder of circularly magnetized material, and in which said electrical conductor passes through said hollow cylinder.

7. A disposable unitary array of photoflash lamps including circuitry for causing said lamps to be flashed sequentially by sequential firing energy pulses of given magnitude and electrical polarity, each of said lamps containing a filament for initiating flashing of the lamp and adapted to become an open circuit when said flashing occurs, wherein the improvement comprises connection means including one or more magnetized core coupling means successively connected in series between the filaments of said lamps to connect said filaments into an electrical parallel circuit through said magnetized core coupling means, and electrical means adapted for connecting the first lamp filament at one end of said parallel circuit to a source of said firing pulses, each of said magnetized core coupling means being magnetized so as to oppose the flow of said firing pulses therethrough, said energy magnitude of a firing pulse being sufficient to reverse the magnetic opposition of a single magnetized core coupling means and cause flashing of the next succeeding lamp.

8. An array as claimed in claim 7, in which each of said magnetized core coupling means comprises an electrical conductor connected between filaments of adjacent lamps, and a magnetized core positioned adjacent to said conductor.

9. An array as claimed in claim 8, in which said magnetized core comprises a hollow cylinder of circularly magnetized material, and in which said electrical conductor passes through said hollow cylinder.

10. A disposable unitary array of photoflash lamps including circuitry for causing said lamps to be flashed sequentially by sequential firing energy pulses of given magnitude and electrical polarity, each of said lamps containing a filament for initiating flashing of the lamp and adapted to become an open circuit when said flashing occurs, wherein the improvement comprises a magnetized core coupling means connected between first ends of the filaments of first and second ones of said lamps, means electrically connecting together the remaining ends of said filaments of the first and second lamps, and electrical means adapted for connecting the filament of said first lamp to receive said firing pulses, said magnetized core coupling means being magnetized so as to oppose the flow of said firing pulses therethrough, said energy magnitude of a firing pulse being sufficient to reverse the magnetic opposition of said magnetized core coupling means and cause flashing of the next succeeding lamp.

11. An array as claimed in claim 10, in which said magnetized core coupling means comprises an electrical conductor connected between said first ends of the filaments, and a magnetized core positioned adjacent to said conductor.

12. An array as claimed in claim 11, in which said magnetized core comprises a hollow cylinder of circularly magnetized material, and in which said electrical conductor passes through said hollow cylinder.

References Cited

UNITED STATES PATENTS

| | | | |
|---|---|---|---|
| 3,532,931 | 10/1970 | Cote et al. | 431—95 |
| 3,617,763 | 11/1971 | Laskowski | 431—95 X |
| 3,619,715 | 11/1971 | Kim | 431—95 X |

EDWARD J. MICHAEL, Primary Examiner